United States Patent
Kamada et al.

(10) Patent No.: US 6,587,797 B1
(45) Date of Patent: Jul. 1, 2003

(54) FLUID CONSUMPTION AMOUNT-MEASURING METHOD AND APPARATUS FOR THE SAME

(75) Inventors: Yuji Kamada, Toyota (JP); Wataru Sato, deceased, late of Toyota (JP), by Nobue Sato, executrix; Kazuo Nakamura, Toyota (JP); Nozomi Hayakawa, Soka (JP)

(73) Assignee: SMC Kabushiki Kaisha, Tokyo (JP)

(*) Notice: Subject to any disclaimer, the term of this patent is extended or adjusted under 35 U.S.C. 154(b) by 0 days.

(21) Appl. No.: 09/622,037
(22) PCT Filed: Feb. 23, 1999
(86) PCT No.: PCT/JP99/00811
§ 371 (c)(1), (2), (4) Date: Feb. 28, 2001
(87) PCT Pub. No.: WO99/42793
PCT Pub. Date: Aug. 26, 1999

(30) Foreign Application Priority Data

Feb. 23, 1998 (JP) ............................................. 10-040859

(51) Int. Cl.⁷ ............................................. F16K 31/12
(52) U.S. Cl. .......................................................... 702/50
(58) Field of Search ........................ 702/50; 73/861.42, 73/202, 861, 203; 137/487.5, 14

(56) References Cited

U.S. PATENT DOCUMENTS 4,825,704 A * 5/1989 Aoshima et al. ......... 73/861.42
5,816,285 A * 10/1998 Ohmi et al. ............. 137/487.5

\* cited by examiner

Primary Examiner—John Barlow
Assistant Examiner—Tung Lau
(74) Attorney, Agent, or Firm—Paul A. Guss (57) ABSTRACT

At first, a stop valve is fully opened to measure a pressure value $P_1$ on the downstream side of the stop valve 66 under this condition. Subsequently, a pressure value $P_2$ on the downstream side of the stop valve is measured when the flow velocity of compressed air flowing through the stop valve is set to be the sound pressure while adjusting the opening degree of the stop valve. Further, a pressure value $P_3$ on the downstream side of the stop valve is measured when an ON/OFF valve is turned ON to release the compressed air from a nozzle. The consumption amount Q of the compressed air flowing through a fluid-operated apparatus is calculated by a calculating unit on the basis of the pressure values $P_1$, $P_2$, $P_3$ and an effective cross-sectional area $S_n$ of the nozzle.

13 Claims, 7 Drawing Sheets

FIG. 9

FLUID CONSUMPTION AMOUNT-MEASURING METHOD AND APPARATUS FOR THE SAME

BACKGROUND OF THE INVENTION

1. Field of the Invention

The present invention relates to a fluid consumption amount-measuring method and an apparatus for the same, for measuring a consumption amount of a fluid such as compressed air in a fluid-operated apparatus.

2. Description of the Related Art

The fluid-operated apparatus is widely used, for example, in the production steps. Usually, the fluid-operated apparatus is constructed such that the pressure fluid is not consumed when the operation is stopped. However, in some cases, the pressure fluid leaks, for example, due to any damage of piping and packing.

A flow rate-measuring apparatus has been hitherto used in order to measure the consumption amount brought about by the leakage of the pressure fluid as described above. The flow rate-measuring apparatus includes, for example, differential pressure flow meters, ultrasonic flow meters, turbine flow meters, hot-wire flow meters, orifice flow meters, and float flow meters.

Figure 8:
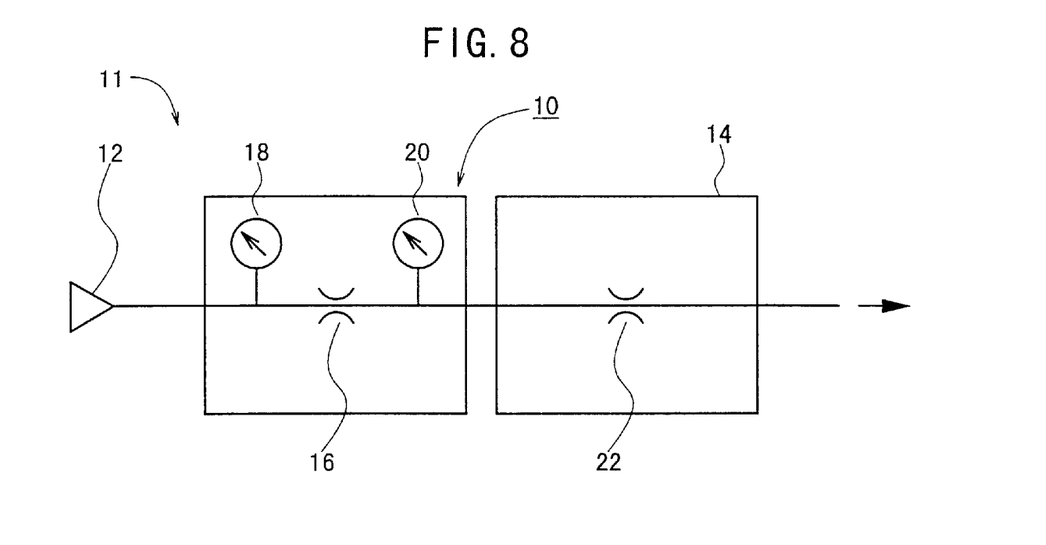
FIG. 8 shows a block diagram illustrating a flow rate-measuring apparatus concerning a conventional technique.

Explanation will now be made for a case in which the consumption amount of the pressure fluid is measured by using the differential pressure flow meter. As shown in FIG. 8, the flow rate-measuring apparatus 10 comprises a throttle 16 having a known cross-sectional area arranged between a pressure fluid supply source 12 for constructing a fluid pressure system 11 and a fluid-operated apparatus 14 as a measurement objective. Pressure gauges 18, 20 are connected on the upstream and downstream sides of the throttle 16 respectively. The amount of the pressure fluid passing through a throttle 22 arranged in the fluid-operated apparatus 14 corresponds to the consumption amount of the pressure fluid consumed by the fluid-operated apparatus 14.

When the consumption amount of the pressure fluid consumed by the fluid-operated apparatus 14 is measured, the pressure fluid supply source 12 is firstly operated to supply the pressure fluid via the throttle 16 to the fluid-operated apparatus 14. During this process, the pressure of the pressure fluid, which is measured by the downstream pressure gauge 20, is inversely proportional to the effective cross-sectional area of the throttle 22 of the fluid-operated apparatus 14. All of the pressure fluid, which flows through the fluid-operated apparatus 14, is supplied via the throttle 16. Therefore, the flow rate of the pressure fluid flowing through the throttle 16 is equal to the flow rate of the pressure fluid supplied to the fluid-operated apparatus 14.

Accordingly, the flow rate of the pressure fluid flowing through the throttle 16 is determined from the pressures of the pressure fluid measured by the pressure gauges 18, 20 respectively and the effective cross-sectional area of the throttle 16. The effective cross-sectional area of the throttle 22 is determined from the flow rate and the pressure of the pressure fluid measured by the downstream pressure gauge 20. Thus, it is possible to determine the flow rate, i.e., the consumption amount of the pressure fluid flowing through the throttle 22 of the fluid-operated apparatus 14, from the effective cross-sectional area of the throttle 22 and the pressure of the pressure fluid measured by the upstream pressure gauge 18.

However, it is considerably difficult to measure the consumption amount brought about by the leakage, by using the flow rate-measuring apparatus 10 as described above. That is, in order to measure the consumption amount of the fluid-operated apparatus 14 highly accurately, it is necessary to select the flow rate-measuring apparatus 10 which has a measuring range in conformity with the degree of the consumption amount. However, the degree of the consumption amount, which is brought about by the leakage of the fluid to be measured, is usually unclear.

Therefore, in order to select the flow rate-measuring apparatus 10 having an optimum measuring range, it is also considered that a trial and error process is performed to attach and detach one selected from a plurality of flow rate-measuring apparatuses 10 having different measuring ranges with respect to the fluid pressure system 11. However, the attachment and detachment operation is extremely complicated. Further, the flow rate-measuring apparatus 10 itself is considerably expensive. Therefore, such a process is not considered to be an appropriate practical method.

Further, as shown in FIG. 8, when the flow rate-measuring apparatus 10 is constructed and connected in series on the upstream stage of the fluid-operated apparatus 14 for constructing the fluid pressure system 11 to measure the consumption amount brought about by the fluid-operated apparatus 14, for example, it is necessary to set a small effective cross-sectional area of the throttle 16 of the flow rate-measuring apparatus 10 in order to measure a small consumption amount highly accurately. As a result, the flow resistance of the pressure fluid becomes large. Therefore, it is difficult to perform the driving operation by supplying a predetermined amount of the pressure fluid to the fluid-operated apparatus 14 while still installing such a flow rate-measuring apparatus 10 after the measurement of the consumption amount.

Figure 9:
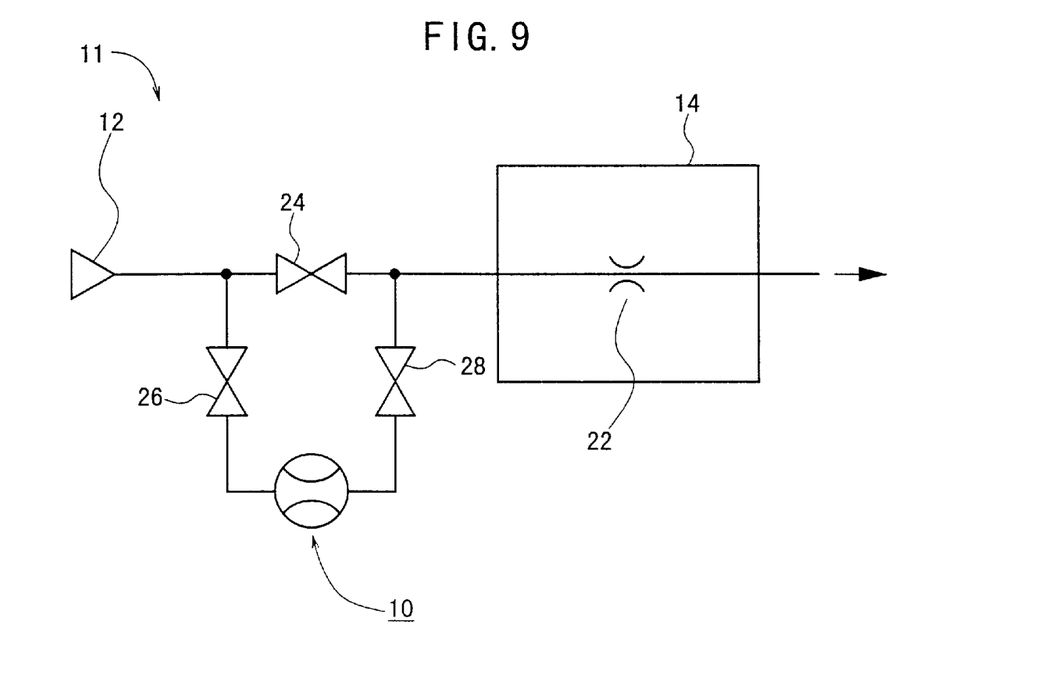
FIG. 9 shows a block diagram illustrating a flow rate-measuring apparatus concerning another conventional technique.

Another arrangement is known as shown in FIG. 9. That is, a stop valve 24 is provided between a pressure fluid supply source 12 and a fluid-operated apparatus 14. A bypass, which comprises a stop valve 26, a flow rate-measuring apparatus 10, and a stop valve 28, is provided between upstream and downstream portions with respect to the stop valve 24. In this arrangement, the stop valves 24, 26, 28 are switched so that the pressure fluid may be supplied to the fluid-operated apparatus 14 via the flow rate-measuring apparatus 10 when the consumption amount is measured, while a predetermined amount of the pressure fluid may be directly supplied to the fluid-operated apparatus 14 while still installing the flow rate-measuring apparatus 10 when the fluid-operated apparatus 14 is driven and operated.

However, even in the case of this arrangement, it is necessary to perform the operation for selecting the flow rate-measuring apparatus 10 having an optimum measuring range in order to measure the consumption amount highly accurately. Therefore, the problem described above cannot be solved.

The present invention has been made in order to solve the problems as described above, an object of which is to provide a fluid consumption amount-measuring method and an apparatus for the same in which the operation including, for example, attachment and detachment to a fluid pressure system is easy, and the consumption amount due to the leakage of a pressure fluid or the like can be easily measured, making it possible to perform highly accurate measurement irrelevant to the measuring range of the consumption amount.

SUMMARY OF THE INVENTION

According to the present invention, even when the measuring range of the consumption amount in the fluid-operated apparatus is unknown, the pressure values $P_1$, $P_2$, $P_3$ on the downstream side of a stop valve are measured and calculated respectively. Thus, it is possible to conveniently measure the consumption amount of the pressure fluid flowing through the fluid-operated apparatus.

Any one of the pressure value $P_2$ and the pressure value $P_3$ may be determined earlier. When the pressure values $P_1$, $P_2$, $P_3$ on the downstream side of the stop valve are measured respectively, then the pressure drop is increased, and the measurement time is shortened by previously releasing a part of the pressure fluid in a forcible manner by the aid of another valve having a known effective cross-sectional area.

According to another aspect of the present invention, it is unnecessary that the fluid consumption amount-measuring apparatus is provided at an intermediate portion of a piping tube extending from a pressure fluid supply source to the fluid-operated apparatus. Therefore, it is easy to attach and detach the fluid consumption amount-measuring apparatus.

According to still another aspect of the present invention, a plurality of sets of ON/OFF valves and nozzles are preferably provided in parallel. In this arrangement, the consumption amount of the pressure fluid is calculated by a calculating unit from a pressure value which is detected by a pressure-detecting member when all of the ON/OFF valves are turned OFF respectively, a total of effective cross-sectional areas of the nozzles connected to the ON/OFF valves which are turned ON when the plurality of ON/OFF valves are selectively turned ON, and a pressure value which is detected by the pressure-detecting member under this condition. By doing so, the effective cross-sectional area of the nozzle is switched to adjust the pressure to be detected by the pressure-detecting means, and thus it is possible to perform the measurement with an optimum pressure range, which is preferred.

Alternatively, it is also preferable that the measuring range is switched by connecting, to the ON/OFF valve, a nozzle having a variable effective cross-sectional area.

According to still another aspect of the present invention, a pressure fluid-discharging valve, to which another nozzle having a known effective cross-sectional area is connected, is preferably provided on the downstream side of the stop valve. In this arrangement, the consumption amount of the pressure fluid is calculated by the calculating unit on the basis of a difference in effective cross-sectional area between the nozzle connected to the ON/OFF valve and the another nozzle connected to the pressure fluid-discharging valve, and a pressure value obtained when the ON/OFF valve is turned OFF and a pressure value obtained when the ON/OFF valve is turned ON in a state in which a part of the pressure fluid of the another nozzle is released by fully opening the pressure fluid-discharging valve.

DETAILED DESCRIPTION OF THE PREFERRED EMBODIMENTS

Figure 1:
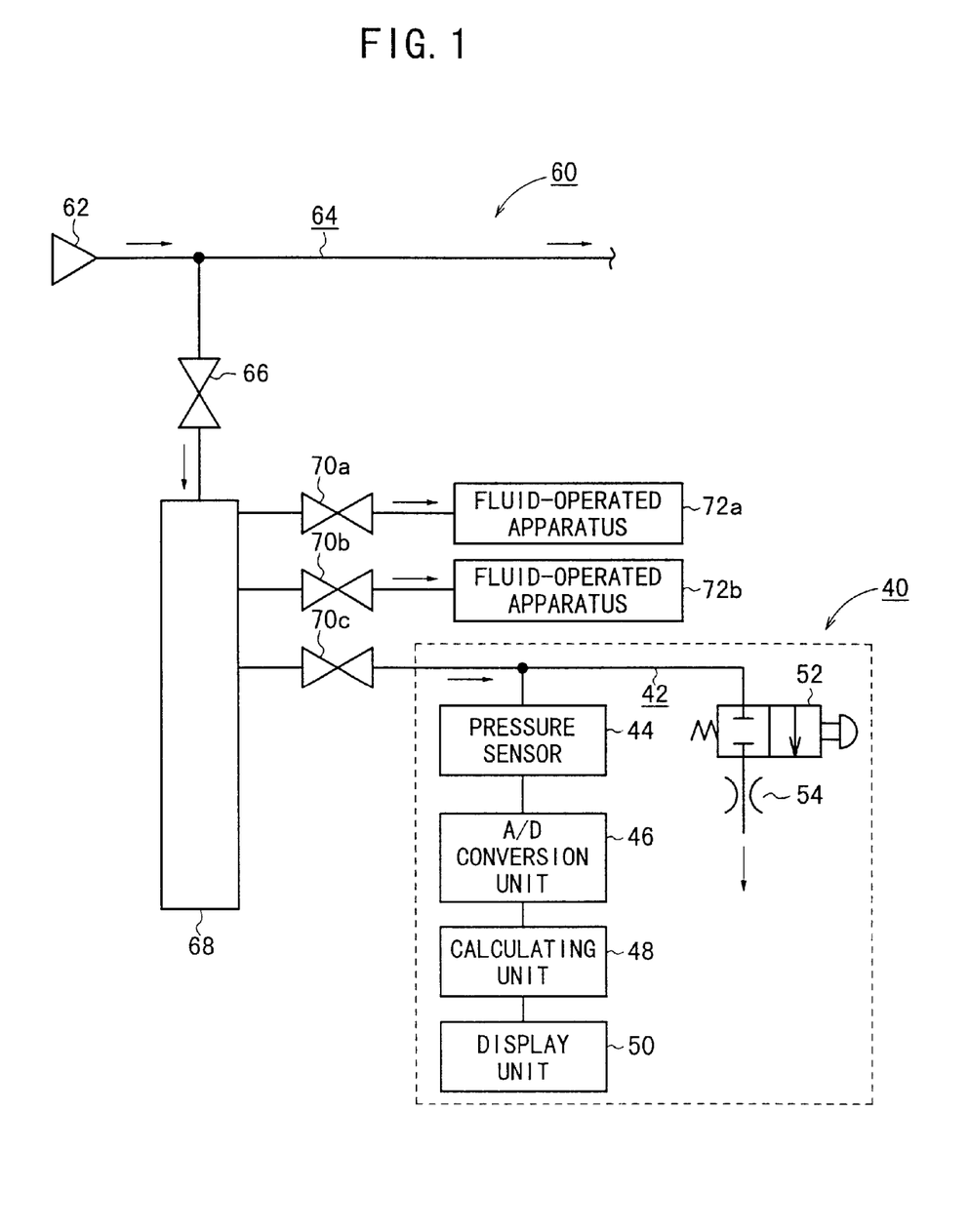
FIG. 1 shows a block diagram illustrating a fluid consumption amount-measuring apparatus according to an embodiment of the present invention.

With reference to FIG. 1, reference numeral 40 indicates a fluid consumption amount-measuring apparatus according to an embodiment of the present invention. The fluid consumption amount-measuring apparatus 40 is provided with a pressure sensor 44 which is connected to a tube passage 42. An output signal of the pressure sensor 44 is converted into a digital signal by an A/D conversion unit 46, and it is inputted into a calculating unit 48. A display unit 50 for displaying a result of calculation is connected to the calculating unit 48. An ON/OFF valve 52 is connected to the tube passage 42. A nozzle 54, which has a known effective cross-sectional area $S_n$, is connected to the ON/OFF valve 52.

The fluid consumption amount-measuring apparatus 40 according to the embodiment of the present invention is basically constructed as described above. Next, explanation will be made for a fluid pressure system 60 to which the fluid consumption amount-measuring apparatus 40 is connected.

The fluid pressure system 60 comprises a pressure fluid supply source 62 for supplying a pressure fluid such as compressed air and gas to a fluid-feeding trunk passage 64 which is arranged, for example, along the wall surface in a factory. A header 68 is connected to the trunk passage 64 at a portion close to the predetermined equipment via a stop valve 66. The stop valve 66 is provided in order that the header 68 is safely attached or detached while the pressure fluid to be supplied to the header 68 is stopped, when the header 68 is attached or detached, for example, due to any change of the equipment. The header 68 is provided with a plurality of stop valves 70a to 70c.

In this embodiment, fluid-operated apparatuses 72a, 72b such as cylinders and air blowers as measurement objectives are connected to the stop valves 70a, 70b. The number of fluid-operated apparatuses connected to the header 68 may be increased or decreased, if necessary. The stop valve 70c is used when the number of the fluid-operated apparatuses 72a, 72b connected to the header 68 is increased. The tube passage 42 of the fluid consumption amount-measuring apparatus 40 is connected to the stop valve 70c.

Next, the operation of the fluid consumption amount-measuring apparatus 40 will be explained with reference to a flow chart shown in FIG. 2 in relation to a fluid consumption amount-measuring method according to the embodiment of the present invention.

In this case, it is assumed that the pressure fluid supply source 62 is always operated in the factory or the like, and the gas such as compressed air as the pressure fluid is introduced into the trunk passage 64.

When the consumption amount is measured, for example, for the leakage of the compressed air concerning the fluid-operated apparatus 72a, 72b, the operator firstly attaches the fluid consumption amount-measuring apparatus 40 to the stop valve 70c.

Subsequently, the stop valve 66 and the stop valves 70a to 70c are fully opened. Accordingly, the compressed air is supplied via the header 68 to the fluid-operated apparatus 72a, 72b and the fluid consumption amount-measuring apparatus 40 (step S1). During this process, the ON/OFF valve 52 is controlled to be in the OFF state.

Subsequently, the pressure sensor 44 is used to measure the pressure value $P_1$ of the compressed air supplied to the tube passage 42 disposed on the downstream side of the stop valve 66 (step S2). During this process, the pressure sensor 44 outputs an analog signal corresponding to the pressure value $P_1$ of the compressed air. The A/D conversion unit 46 converts the analog signal into a digital signal to be inputted into the calculating unit 48. The calculating unit 48 displays the pressure value $P_1$ by the aid of the display unit 50. Data corresponding to the pressure value $P_1$ is stored in an unillustrated memory.

In this case, the opening degree of the stop valve 66 is fully open. Therefore, the pressure value $P_1$ on the downstream side of the stop valve 66 is equal to the pressure value of the compressed air on the upstream side of the stop valve 66.

Subsequently, the opening degree of the stop valve 66 is adjusted so that the flow velocity of the compressed air flowing through the stop valve 66 is the sound velocity (step S3).

Figure 3:
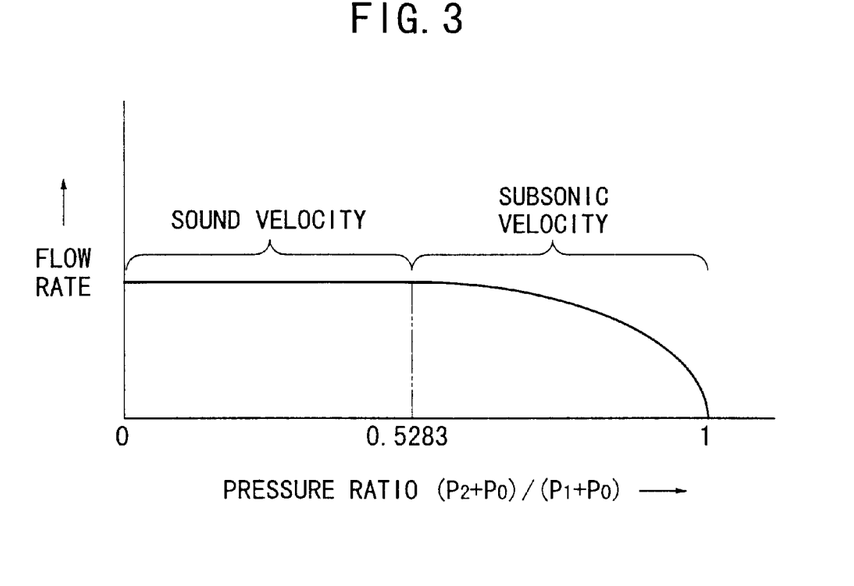
FIG. 3 shows a graph illustrating a relationship between the pressure values $P_1$, $P_2$ measured by a pressure sensor for constructing the fluid consumption amount-measuring apparatus shown in FIG. 1 and the flow velocity of the compressed air flowing through a stop valve.

It is known that the flow velocity of the compressed air flowing through the stop valve 66 is the sound velocity if the following relationship is satisfied for the pressure value $P_1$ on the upstream side of the stop valve 66 and the pressure value $P_2$ on the downstream side of the stop valve 66.

$$(P_2+P_0)/(P_1+P_0) \leq 0.5283 \quad (1)$$

wherein $P_0$ represents the atmospheric pressure. In this case, when the flow velocity of the compressed air flowing through the stop valve 66 is set to be the sound velocity, the flow rate of the compressed air flowing through the stop valve 66 is substantially constant (see FIG. 3).

When the expression (1) is substituted with the atmospheric pressure $P_0=1.033$ kgf/cm², the following relationship is obtained.

$$P_2 \leq 0.5283 \times (P_1+1.033)-1.033 \quad (2)$$

Figure 4:
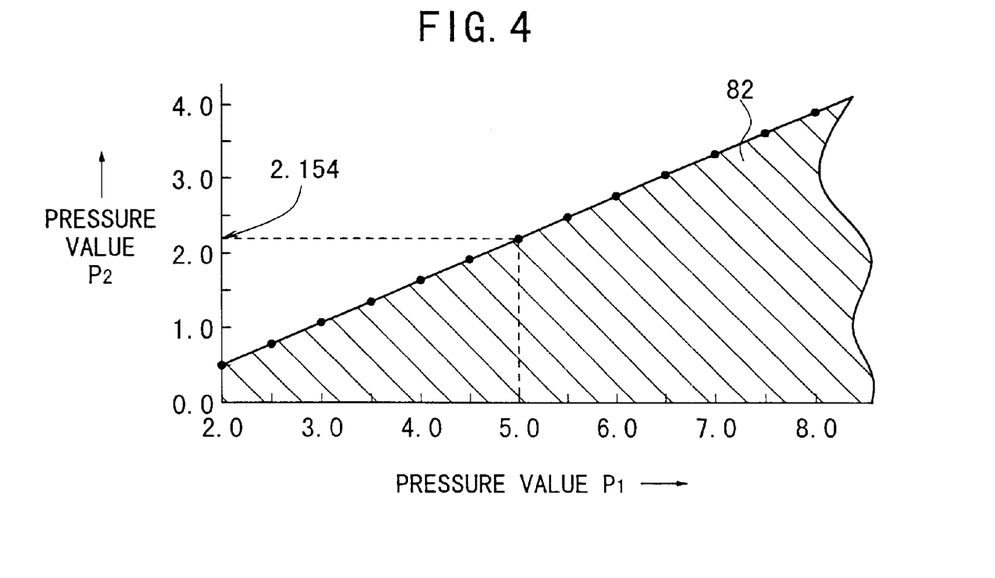
FIG. 4 shows a graph illustrating a relationship between the pressure value $P_1$ and the pressure value $P_2$ measured by the pressure sensor.

A graph, which is obtained when the equality holds in the expression (2), is shown in FIG. 4.

Accordingly, the opening degree of the stop valve 66 is adjusted so that the relationship of the pressure value $P_2$ with respect to the pressure value $P_1$ resides in a region 82 of hatched portion shown in FIG. 4, while the opening degree of the stop valve 66 is adjusted. The pressure value $P_2$ on the downstream side of the stop valve 66, which is obtained when the flow velocity of the pressure fluid flowing through the stop valve 66 is set to be the sound pressure, is measured by using the pressure sensor 44 (step S4). For example, the stop valve 66 is throttled so that the pressure value $P_2$ is not more than 2.154 kgf/cm² when the pressure value $P_1$ is 5 kgf/cm².

Subsequently, the ON/OFF valve 52 is turned ON, and the compressed air is released from the nozzle 54 to the atmospheric air (step S5). At this time, the pressure value $P_3$ on the downstream side of the stop valve 66 is measured by using the pressure sensor 44 (step S6).

The pressure values $P_2$, $P_3$ measured as described above are judged (steps S7, S9), from which the effective cross-sectional area S of the flow passage of the fluid-operated apparatus 72a, 72b is calculated by the calculating unit 48, together with the effective cross-sectional area $S_n$ of the nozzle 54 (steps S8, S10, S11).

The effective cross-sectional area S of the flow passage of the fluid-operated apparatus 72a, 72b is proportional to the consumption amount (leakage amount) of the compressed air concerning the fluid-operated apparatus 72a, 72b. The consumption amount (leakage amount) of the compressed air flowing through the flow passage of the fluid-operated apparatus 72a, 72b and the nozzle 54 is proportional to the total of the effective cross-sectional area S of the flow passage of the fluid-operated apparatus 72a, 72b and the effective cross-sectional area $S_n$ of the nozzle 54. Therefore, the consumption amount (leakage amount) of the compressed air concerning the fluid-operated apparatus 72a, 72b is determined from the relationship between the consumption amount (leakage amount) of the compressed air concerning the fluid-operated apparatus 72a, 72b obtained when the ON/OFF valve 52 is turned OFF, and the consumption amount (leakage amount) of the compressed air flowing through the flow passage of the fluid-operated apparatus 72a, 72b and the nozzle 54 obtained when the ON/OFF valve 52 is turned ON. During this process, there are four cases including a case in which the flow velocity of the compressed air released from the fluid-operated apparatus 72a, 72b is the sound velocity or the subsonic velocity and a case in which the flow velocity of the compressed air released from the fluid-operated apparatus 72a, 72b and the nozzle 54 is the sound velocity or the subsonic velocity respectively. Explanation will be made below as being classified into the respective cases.

At first, when the ON/OFF valve 52 is in the OFF state, it is judged whether the flow velocity of the compressed air outflowing from the fluid-operated apparatus 72a, 72b to the outside is either the sound velocity or the subsonic velocity.
If the following expression holds:

$$P_0/(P_2+P_0) \leq 0.5283$$

that is, if the following expression holds when the expression is substituted with the atmospheric pressure $P_0=1.033$ kgf/cm²:

$$P_2 \leq 0.9223 \text{ [kgf/cm}^2\text{]}$$

then the flow velocity of the compressed air outflowing from the fluid-operated apparatus 72a, 72b to the outside is the sound velocity. In this case, the consumption amount Q of the compressed air flowing through the flow passage of the fluid-operated apparatus 72a, 72b is expressed as follows provided that the temperature of the pressure fluid is θ.

$$Q=11.1 \times S \times (P_2+P_0) \times \sqrt{\{273/(273+\theta)\}} \quad (3)$$

On the other hand, if the following expression holds:

$$P_0/(P_2+P_0) > 0.5283$$

that is, if the following expression holds when the expression is substituted with the atmospheric pressure $P_0=1.033$ kgf/cm²:

$$P_2 < 0.9223 \text{ [kgf/cm}^2\text{]}$$

then the flow velocity of the compressed air outflowing from the fluid-operated apparatus 72a, 72b to the outside is the subsonic velocity. In this case, the consumption amount Q of the compressed air flowing through the flow passage of the fluid-operated apparatus 72a, 72b is expressed as follows.

$$Q = 22.2 \times S \times \sqrt{(P_2 + P_0)} \times \sqrt{\{273/(273+\theta)\}} \quad (4)$$

Subsequently, when the ON/OFF valve 52 is in the ON state, it is judged whether the flow velocity of the compressed air outflowing from the fluid-operated apparatus 72a, 72b and the nozzle 54 to the outside is either the sound velocity or the subsonic velocity.

If the following expression holds:

$$P_3 \geq 0.9223 \ [kgf/cm^2]$$

then the flow velocity of the compressed air outflowing from the fluid-operated apparatus 72a, 72b and the nozzle 54 to the outside is the sound velocity. In this case, the consumption amount Q of the compressed air flowing through the flow passage of the fluid-operated apparatus 72a, 72b and the nozzle 54 is expressed as follows.

$$Q = 11.1 \times (S + S_n) \times (P_3 + P_0) \times \sqrt{\{273/(273+\theta)\}} \quad (5)$$

On the other hand, if the following expression holds:

$$P_3 < 0.9223 \ [kgf/cm^2]$$

then the flow velocity of the compressed air outflowing from the fluid-operated apparatus 72a, 72b and the nozzle 54 to the outside is the subsonic velocity. In this case, the consumption amount Q of the compressed air flowing through the flow passage of the fluid-operated apparatus 72a, 72b and the nozzle 54 is expressed as follows.

$$Q = 22.2 \times (S + S_n) \times \sqrt{(P_3 \times P_0)} \times \sqrt{\{273/(273+\theta)\}} \quad (6)$$

The consumption amount Q of the compressed air supplied to the fluid-operated apparatus 72a, 72b and the nozzle 54 is coincident with the flow rate of the compressed air flowing through the stop valve 66. The flow velocity of the compressed air flowing through the stop valve 66 is the sound velocity as described above. Therefore, the consumption amount Q is constant.

The combined effective cross-sectional area S of the flow passage of the fluid-operated apparatus 72a, 72b is determined as follows while judging the magnitudes of the pressure value $P_2$ and the pressure value $P_3$ respectively.

That is, if the pressure values $P_2$, $P_3$ satisfy the following expressions (in the case of YES in the step S7):

$$P_2 \geq 0.9223 \ [kgf/cm^2]$$

$$P_3 \geq 0.9223 \ [kgf/cm^2]$$

then the effective cross-sectional area S is determined as follows from the expressions (3) and (5) (step S8):

$$11.1 \times S \times (P_2 + P_0) \times \sqrt{\{273/(273+\theta)\}} = 11.1 \times (S + S_n) \times (P_3 + P_0) \times \sqrt{\{273/(273+\theta)\}}$$

$$S = S_n \times (P_3 + P_0)/(P_2 - P_3) \quad (7)$$

provided that $P_2 \neq P_3$ is satisfied.

On the other hand, if the pressure values $P_2$, $P_3$ satisfy the following expressions (in the case of NO in the step S7 and YES in the step S9):

$$P_2 \geq 0.9223 \ [kgf/cm^2]$$

$$P_3 < 0.9223 \ [kgf/cm^2]$$

then the effective cross-sectional area S is determined as follows from the expressions (3) and (6) (step S10).

$$11.1 \times S \times (P_2 + P_0) \times \sqrt{\{273/(273+\theta)\}} = 22.2 \times (S + S_n) \times \sqrt{(P_3 \times P_0)} \times \sqrt{\{273/(273+\theta)\}}$$

$$S = 2 \times S_n \times \sqrt{(P_3 \times P_0)}/\{P_2 + P_0 - 2 \times \sqrt{(P_3 \times P_0)}\} \quad (8)$$

Further, if the pressure values $P_2$, $P_3$ satisfy the following expressions (in the case of NO in the step S9):

$$P_2 < 0.9223 \ [kgf/cm^2]$$

$$P_3 < 0.9223 \ [kgf/cm^2]$$

then the effective cross-sectional area S is determined as follows from the expressions (4) and (6) (step S11):

$$22.2 \times S \times \sqrt{(P_2 + P_0)} \times \sqrt{\{273/(273+\theta)\}} = 22.2 \times (S + S_n) \times \sqrt{(P_3 \times P_0)} \times \sqrt{\{273/(273+\theta)\}}$$

$$S = S_n \times \sqrt{(P_3)}/\{\sqrt{(P_2)} - \sqrt{(P_3)}\} \quad (9)$$

provided that $\sqrt{(P_2)} \neq \sqrt{(P_3)}$ is satisfied.

When the ON/OFF valve 52 is turned ON, the flow passage of the compressed air is increased in an amount of the effective cross-sectional area $S_n$ of the nozzle 54. Therefore, the pressure value $P_3$ obtained in this case is not larger than the pressure value $P_2$ obtained in the state in which the ON/OFF valve 52 is turned OFF. Therefore, the following expressions are never given.

$$P_2 < 0.9223 \ [kgf/cm^2]$$

$$P_3 \geq 0.9223 \ [kgf/cm^2]$$

As described above, the effective cross-sectional area S of the flow passage of the fluid-operated apparatus 72a, 72b is calculated on the basis of the pressure value $P_2$ detected by the pressure sensor 44 in the state in which the ON/OFF valve 52 is turned OFF, the pressure value $P_3$ detected by the pressure sensor 44 in the state in which the ON/OFF valve 52 is turned ON, and the effective cross-sectional area $S_n$ of the nozzle 54.

Subsequently, when the effective cross-sectional area S of the flow passage of the fluid-operated apparatus 72a, 72b is determined, the effective cross-sectional area S can be used to determine the consumption amount Q of the compressed air flowing through the flow passage of the fluid-operated apparatus 72a, 72b when the stop valve 66 is in the fully open state.

That is, the data, which corresponds to the pressure value $P_1$ previously detected in the step S2, is read from the unillustrated memory to judge the magnitude of the pressure value $P_1$ (step S12). If the following expression holds:

$$P_1 \geq 0.9223 \ [kgf/cm^2]$$

then it is judged that the flow velocity of the compressed air flowing through the fluid-operated apparatus 72a, 72b is the sound velocity to determine the consumption amount Q based on the following expression (step S13).

$$Q = 11.1 \times S \times (P_1 + P_0) \times \sqrt{\{273/(273+\theta)\}} \quad (10)$$

On the other hand, if the following expression holds:

$$P_1 < 0.9223 \ [kgf/cm^2]$$

then it is judged that the flow velocity of the compressed air flowing through the fluid-operated apparatus 72a, 72b is the subsonic velocity to determine the consumption amount Q based on the following expression (step S14).

$$Q = 22.2 \times S \times \sqrt{(P_1 \times P_0)} \times \sqrt{\{273/(273+\theta)\}} \quad (11)$$

The consumption amount Q determined as described above is displayed on the display unit 50 (step S15).

The consumption amount Q represents the consumption amount Q of the compressed air which leaks from the fluid-operated apparatus 72*a*, 72*b* when the fluid-operated apparatus 72*a*, 72*b* is in the stopped state. Accordingly, it is possible to judge whether or not the fluid-operated apparatus 72*a*, 72*b* is abnormal, from the consumption amount Q. Further, it is possible to make a countermeasure for the leak portion so that the consumption amount of the compressed air is decreased, because the leakage of the compressed air can be examined with ease as described above.

When the consumption amount of the compressed air is measured for one of the fluid-operated apparatuses 72, 72*b*, the following procedure is available. That is, one of the stop valves 70*a*, 70*b*, to which the fluid-operated apparatus 72*a*, 72*b* to be measured is connected, is in the fully open state, and the other is in the fully closed state to measure the consumption amount of the compressed air.

When the fluid-operated apparatus 72*a*, 72*b* is an air blower, it is possible to measure the consumption amount of the compressed air during the operation thereof. In the embodiment of the present invention, the unit of the pressure is expressed by [kgf/cm$^2$] based on the gravitational unit system. However, it is also preferable that the pressure is expressed by [psi]. Alternatively, the pressure may be expressed by [Pa] based on the SI unit system.

In the embodiment of the present invention, when the fluid consumption amount-measuring apparatus 40 is attached, for example, to the production step, the attachment operation is easy, because it is unnecessary to arrange the fluid consumption amount-measuring apparatus 40 between the fluid-operated apparatus 72*a*, 72*b* and the pressure fluid supply source 62. Further, it is unnecessary to stop the entire production step or the like in which the fluid-operated apparatus 72*a*, 72*b* to be subjected to the measurement is used. The measurement can be performed by stopping only the fluid-operated apparatus 72*a*, 72*b*.

In the embodiment of the present invention, it is easy to attach and detach the fluid consumption amount-measuring apparatus 40. Therefore, the portion, for which it is necessary to measure the consumption amount of the compressed air in the production step or the like, can be arbitrarily selected to install the fluid consumption amount-measuring apparatus 40.

In the embodiment of the present invention, even when the consumption amount of the pressure fluid intended to be measured is unclear as in the case in which the pressure fluid leaks, the consumption amount of the pressure fluid can be measured easily and highly accurately.

In the embodiment of the present invention, the pressure value $P_3$ (step S6) is measured after the pressure value $P_2$ (step S4) is measured. However, the measurement sequence may be inverted. That is, the pressure value $P_3$ is measured when the ON/OFF valve 52 is turned ON to release the compressed air from the nozzle 54 in the state in which the flow velocity of the pressure fluid flowing through the stop valve 66 is set to be the sound velocity, and then the ON/OFF valve 52 is switched to OFF to measure the pressure value $P_2$.

In the embodiment of the present invention, one nozzle 54 is provided. However, there is no limitation thereto. In a fluid consumption amount-measuring apparatus 80 according to another embodiment shown in FIG. 5, it is also preferable that a plurality of ON/OFF valves 52*a* to 52*c* are connected to the tube passage 42 in parallel, and nozzles 54*a* to 54*c* having known effective cross-sectional areas $S_n$ are connected to downstream sides of the respective ON/OFF valves 52*a* to 52*c* respectively.

Figure 5:
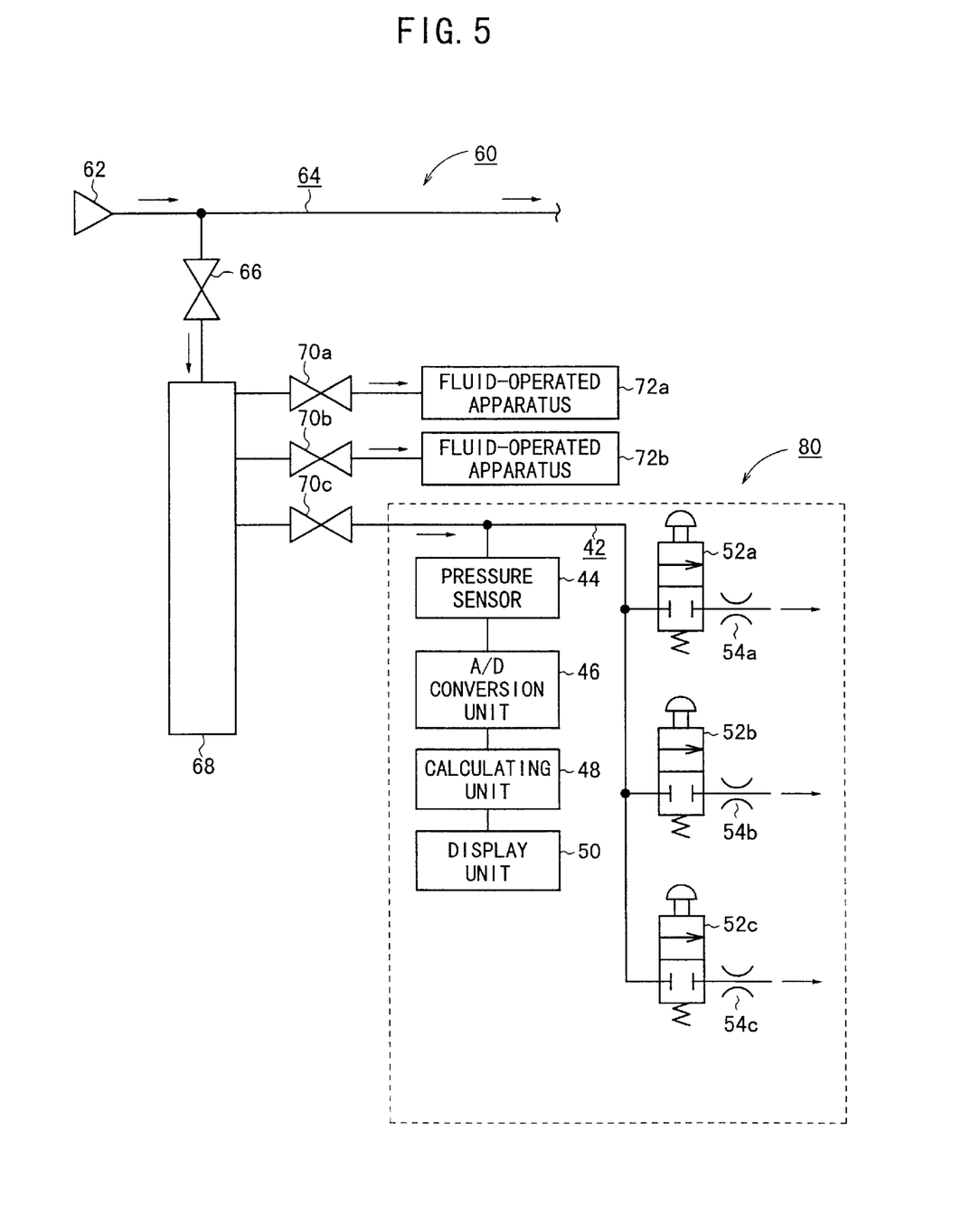
FIG. 5 shows a block diagram illustrating a fluid consumption amount-measuring apparatus according to another embodiment of the present invention.

In this arrangement, any one of the plurality of ON/OFF valves 52*a* to 52*c* is selectively turned ON to adjust the pressure applied to the pressure sensor 44 so that the measurement is performed in an optimum pressure range. Thus, the consumption amount can be measured highly accurately. Owing to the arrangement as described above, the measurable range of the flow rate is substantially enlarged. Therefore, unlike the conventional technique, it is unnecessary to perform the measurement by exchanging flow rate-measuring apparatuses having different measuring ranges in trial and error.

Figure 6:
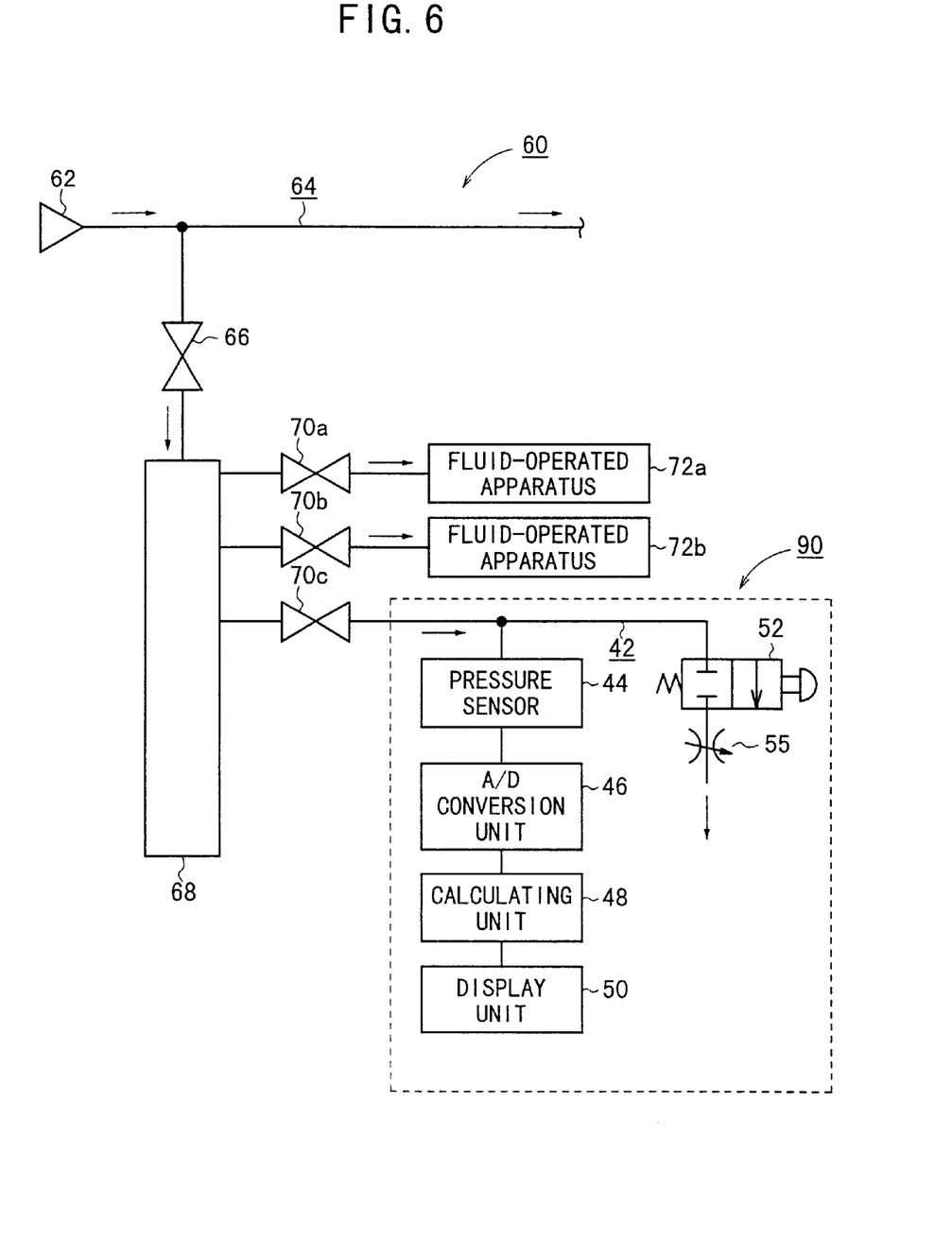
FIG. 6 shows a block diagram illustrating a fluid consumption amount-measuring apparatus according to still another embodiment of the present invention.

As shown in FIG. 6, in a fluid consumption amount-measuring apparatus 90 according to still another embodiment, the effective cross-sectional area $S_n$ of a nozzle 55 connected to the ON/OFF valve 52 is constructed to be variable. Accordingly, it is also possible to adjust the range of the pressure to be applied to the pressure sensor 44.

Figure 7:
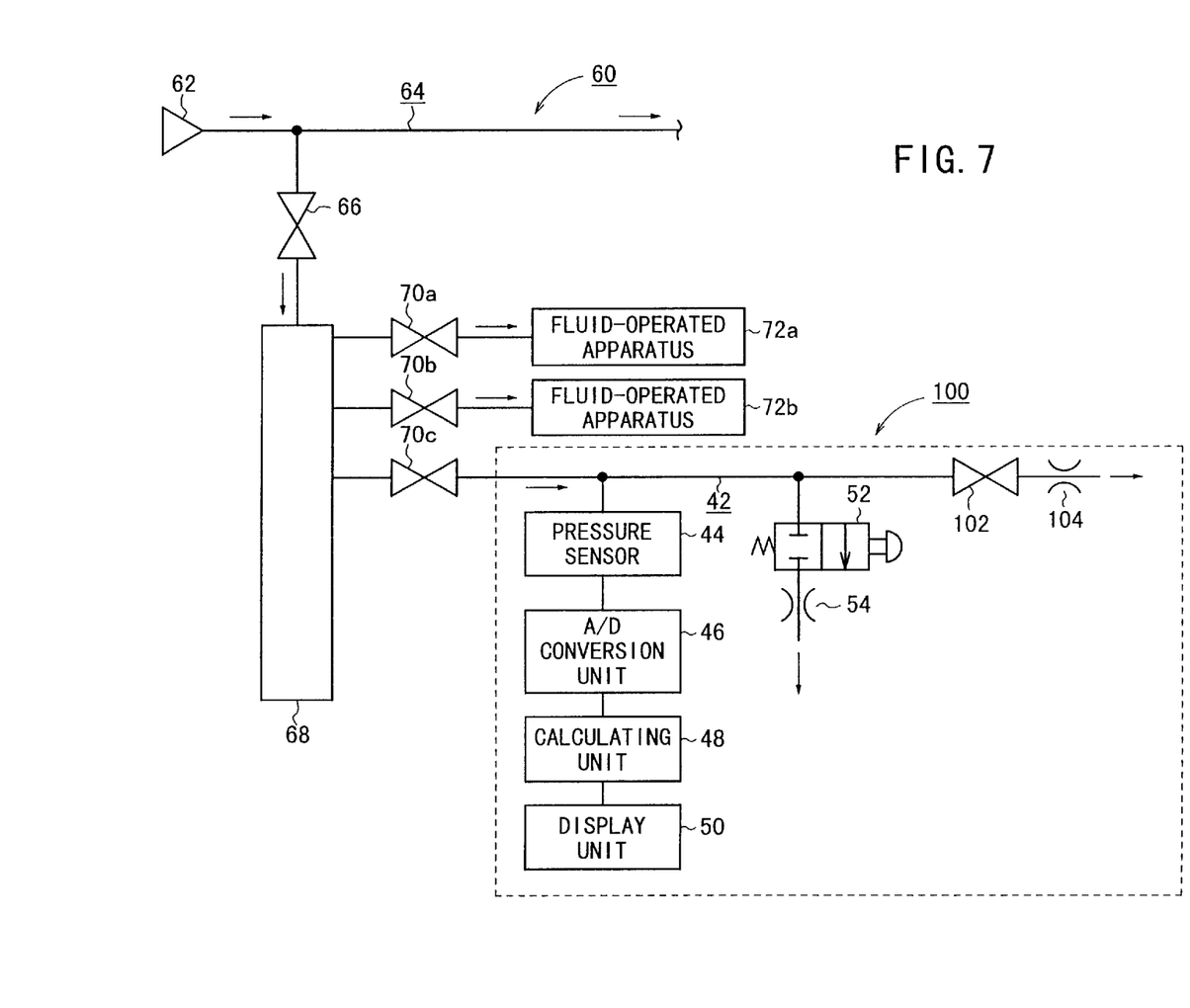
FIG. 7 shows a block diagram illustrating a fluid consumption amount-measuring apparatus according to still another embodiment of the present invention.

FIG. 7 shows a fluid consumption amount-measuring apparatus 100 according to still another embodiment. The same constitutive components as those of the fluid consumption amount-measuring apparatus 40 shown in FIG. 1 are designated by the same reference numerals, detailed explanation of which will be omitted.

The fluid consumption amount-measuring apparatus 100 according to the still another embodiment has the following feature. That is, a stop valve 102 for discharging the pressure fluid is connected to the tube passage 42 on the upstream side of the ON/OFF valve 52. Further, a nozzle 104 having a known effective cross-sectional area is connected to the stop valve 102 for discharging the pressure fluid.

Figure 2:
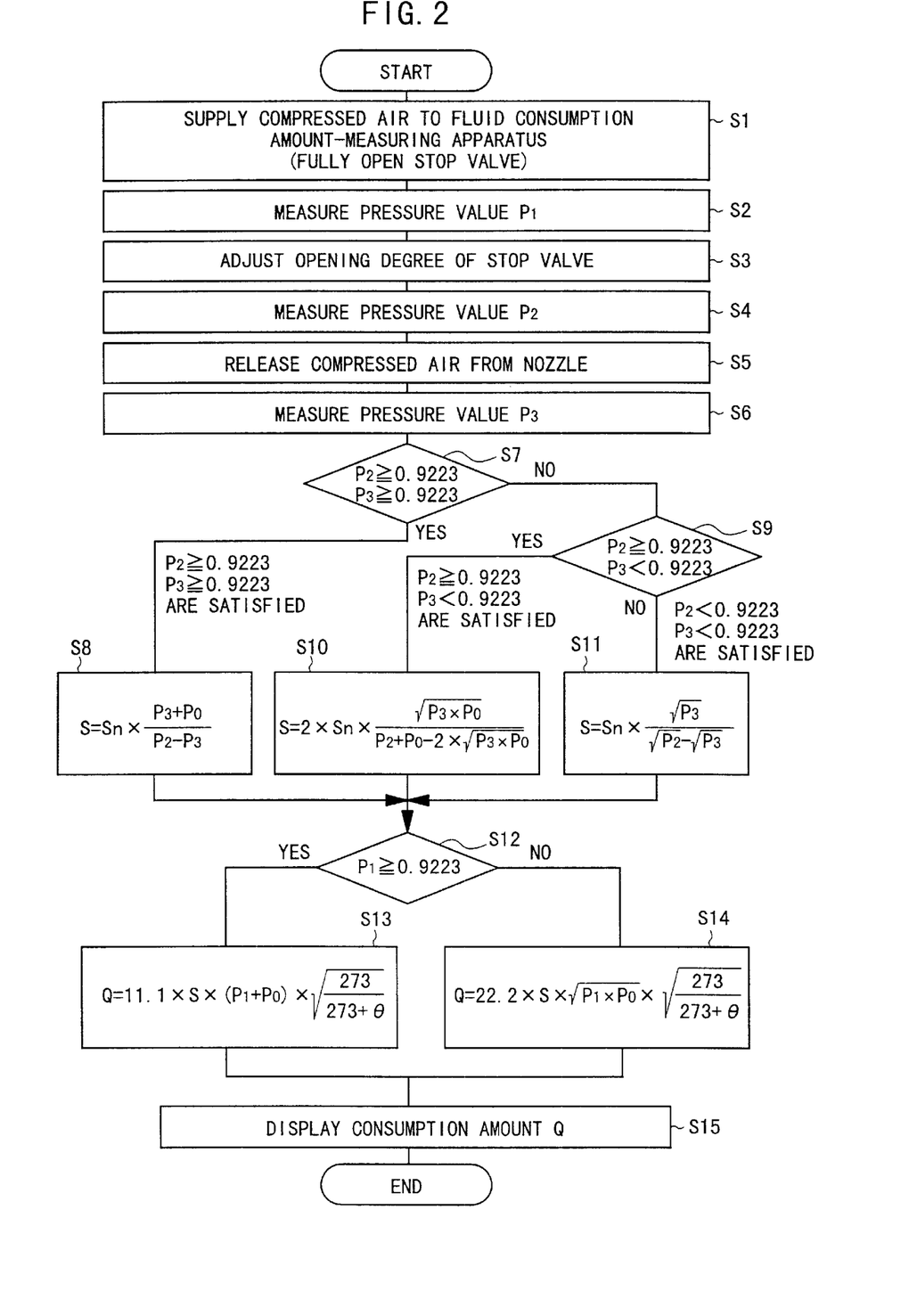
FIG. 2 shows a flow chart illustrating a fluid consumption amount-measuring method according to the embodiment of the present invention.

That is, when the consumption amount (leakage amount of the compressed air) of the fluid-operated apparatus 72*a*, 72*b* is small, or when the volume of the interior of the piping is large, then the pressure drop is small in some cases, even if the ON/OFF valve 52 is switched to ON to release the compressed air from the nozzle 54 to the atmospheric air as shown in step S5 in FIG. 2. In such a case, the opening degree of the stop valve 102 for discharging the pressure fluid is previously fully open to forcibly discharge a small amount of the pressure fluid from the nozzle 104 beforehand. Accordingly, it is possible to increase the pressure drop, and it is possible to shorten the measurement time.

It is assumed that the effective cross-sectional area of the nozzle 104 is set to be smaller than the effective cross-sectional area of the nozzle 54 connected to the ON/OFF valve 52. The combined effective cross-sectional area $S_n$ of the nozzle 54 in the expressions (5) to (9) is calculated by substituting the expression with a value obtained by subtracting the effective cross-sectional area of the nozzle 104 from the effective cross-sectional area of the nozzle 54.

According to the present invention, when the operation is performed to attach and detach the fluid consumption amount-measuring apparatus, for example, with respect to the production step in which the fluid-operated apparatus is used, then the operation of attachment and detachment is easy, the time required for the measurement is shortened, and the operation efficiency is improved, as compared with the conventional technique in which the fluid consumption amount-measuring apparatus is connected between the pressure fluid supply source and the fluid-operated apparatus.

Further, according to the present invention, the measurable range of the consumption amount is substantially enlarged. Therefore, unlike the conventional technique, it is unnecessary to select the fluid consumption amount-measuring apparatus corresponding to the consumption amount. The installation operation is easier, and it is possible to easily and highly accurately measure the consumption amount for which the measuring range is unclear as in the leakage of the pressure fluid.

What is claimed is:

1. A fluid consumption amount-measuring method for measuring a consumption amount of a pressure fluid for a fluid-operated apparatus connected to a pressure fluid supply source via a stop valve, said method comprising:

a first step of measuring a pressure value $P_1$ on a downstream side of said stop valve by fully opening said stop valve;

a second step of measuring a pressure value $P_2$ on said downstream side of said stop valve when an opening degree of said stop valve is adjusted to set a flow velocity of said pressure fluid flowing through said stop valve to be a sound velocity, and connecting a nozzle having a known effective cross-sectional area $S_n$ on said downstream side of said stop valve to measure a pressure value $P_3$ on said downstream side of said stop valve when a part of said pressure fluid is released from said nozzle; and a third step of calculating an effective cross-sectional area S of a flow passage of said fluid-operated apparatus by using said measured pressure values $P_2$, $P_3$ and said effective cross-sectional area $S_n$ of said nozzle, and calculating said consumption amount Q of said pressure fluid for said fluid-operated apparatus from said calculated effective cross-sectional area S of said flow passage of said fluid-operated apparatus and said measured pressure value $P_1$.

2. The fluid consumption amount-measuring method according to claim 1, wherein in said second step, said opening degree of said stop valve is adjusted so that said pressure value $P_1$ and said pressure value $P_2$ satisfy:

$$(P_2+P_0)/(P_1+P_0) \leq 0.5283$$

provided that $P_0$ represents atmospheric pressure.

3. The fluid consumption amount-measuring method according to claim 1 or 2, wherein in said third step, said effective cross-sectional area S of said flow passage of said fluid-operated apparatus is determined as follows:

$$S=S_n \times (P_3+P_0)/(P_2-P_3)$$

provided that $P_0$ represents atmospheric pressure, and there are given:

$$P_2 \geq 0.9223 \text{ kgf/cm}^2$$

$$P_3 \geq 0.9223 \text{ kgf/cm}^2$$

$$P_2 \neq P_3;$$

or $$S=2 \times S_n \times \sqrt{(P_3 \times P_0)}/\{P_2+P_0-2\times\sqrt{(P_3 \times P_0)}\}$$

provided that there are given:

$$P_2 \geq 0.9223 \text{ kgf/cm}^2$$

$$P_3 < 0.9223 \text{ kgf/cm}^2;$$

or $$S=S_n \times \sqrt{(P_3)}/\{\sqrt{(P_2)}-\sqrt{(P_3)}\}$$

provided that there are given:

$$P_2 < 0.9223 \text{ kgf/cm}^2$$

$$P_3 < 0.9223 \text{ kgf/cm}^2$$

$$\sqrt{(P_2)} \neq \sqrt{(P_3)}.$$

4. The fluid consumption amount-measuring method according to any one of claim 1 or 2, wherein in said third step, said consumption amount Q of said pressure fluid flowing through said fluid-operated apparatus is determined as follows:

$$Q=11.1 \times S \times (P_1+P_0) \times \sqrt{\{273/(273+\theta)\}}$$

provided that $\theta$ represents temperature of said pressure fluid, and there is given:

$$P_1 \geq 0.9223 \text{ kgf/cm}^2;$$

or $$Q=22.2 \times S \times \sqrt{(P_1 \times P_0)} \times \sqrt{\{273/(273+\theta)\}}$$

provided that there is given:

$$P_1 < 0.9223 \text{ kgf/cm}^2.$$

5. The fluid consumption amount-measuring method according to claim 1, wherein in said second step, said pressure value $P_2$ on said downstream side of said stop valve is measured when said opening degree of said stop valve is adjusted so that said flow velocity of said pressure fluid flowing through said stop valve is set to be said sound velocity, and then said nozzle having said known effective cross-sectional area $S_n$ is connected on said downstream side of said stop valve to measure said pressure value $P_3$ on said downstream side of said stop valve when said part of said pressure fluid is released from said nozzle.

6. The fluid consumption amount-measuring method according to claim 1, wherein in said second step, in a state in which said nozzle having said known effective cross-sectional area $S_n$ is connected on said downstream side of said stop valve, and said opening degree of said stop valve is adjusted so that said flow velocity of said pressure fluid flowing through said stop valve is set to be said sound velocity; said pressure value $P_3$ on said downstream side of said stop valve, which is obtained when said part of said pressure fluid is released from said nozzle, is measured, and then said release of said pressure fluid from said nozzle is stopped to measure said pressure value $P_2$ on said downstream side of said stop valve.

7. The fluid consumption amount-measuring method according to claim 5 or 6, wherein a pressure fluid-discharging valve, to which another nozzle having a known effective cross-sectional area is connected, is provided on said downstream side of said stop valve, and said pressure value $P_2$ and said pressure value $P_3$ are measured in a state in which said pressure fluid-discharging valve is fully open to release a part of said pressure fluid from said another nozzle.

8. A fluid consumption amount-measuring apparatus for measuring a consumption amount of a pressure fluid for a fluid-operated apparatus connected to a pressure fluid supply source via a stop valve, said apparatus comprising:

a pressure-detecting member connected on a downstream side of said stop valve, for detecting a pressure of said pressure fluid flowing through a tube passage;

an ON/OFF valve connected on said downstream side of said stop valve;

a nozzle having a known effective cross-sectional area $S_n$ connected on a downstream side of said ON/OFF valve; and a calculating unit for calculating and determining said consumption amount Q of said pressure fluid for said fluid-operated apparatus by using a pressure value measured by said pressure-detecting member and said effective cross-sectional area $S_n$, wherein an opening degree of said stop valve is adjustable for setting a flow velocity of said pressure fluid flowing through said stop valve to be a sound velocity.

9. The fluid consumption amount-measuring apparatus according to claim 8, wherein said calculating unit determines an effective cross-sectional area S of a flow passage of said fluid-operated apparatus as follows, provided that $P_2$ represents a pressure value of said pressure fluid supplied to said downstream side of said stop valve and measured by said pressure-detecting member when a flow velocity of said pressure fluid flowing through said stop valve is set to be a sound velocity in a state in which said ON/OFF valve is turned OFF, and $P_3$ represents a pressure value of said pressure fluid supplied to said downstream side of said stop valve and measured by said pressure-detecting member in a state in which said ON/OFF valve is turned ON:

$$S=S_n\times(P_3+P_0)/(P_2-P_3)$$

provided that $P_0$ represents atmospheric pressure, and there are given:

$$P_2\geq 0.9223\ \text{kgf/cm}^2$$

$$P_3\geq 0.9223\ \text{kgf/cm}^2$$

$$P_2\neq P_3;$$

or $$S=2\times S_n\times\surd(P_3\times P_0)/\{P_2+P_0-2\times\surd(P_3\times P_0)\}$$

provided that there are given:

$$P_2\geq 0.9223\ \text{kgf/cm}^2$$

$$P_3<0.9223\ \text{kgf/cm}^2;$$

or $$S=S_n\times\surd(P_3)/\{\surd(P_2)-\surd(P_3)\}$$

provided that there are given:

$$P_2<0.9223\ \text{kgf/cm}^2$$

$$P_3<0.9223\ \text{kgf/cm}^2$$

$$\surd(P_2)\neq\surd(P_3).$$

10. The fluid consumption amount-measuring apparatus according to claim 8 or 9, wherein said calculating unit determines said consumption amount Q of said pressure fluid for said fluid-operated apparatus as follows:

$$Q=11.1\times S\times(P_1+P_0)\times\surd\{273/(273+\theta)\}$$

provided that θ represents temperature of said pressure fluid, and there are given:

$P_0$: atmospheric pressure $P_1$: pressure value of said pressure fluid supplied from said pressure fluid supply source $$P_1\geq 0.9223\ \text{kgf/cm}^2;$$

or $$Q=22.2\times S\times\surd(P_1\times P_0)\times\surd\{273/(273+\theta)\}$$

provided that there is given:

$$P_1<0.9223\ \text{kgf/cm}^2.$$

11. The fluid consumption amount-measuring apparatus according to any one of claim 8 or 9, wherein said fluid consumption amount-measuring apparatus comprises, in parallel, a plurality of sets of said ON/OFF valves and said nozzles; and wherein said consumption amount of said pressure fluid is calculated by said calculating unit from a pressure value detected by said pressure-detecting member when all of said respective ON/OFF valves are turned OFF, a total of effective cross-sectional areas of said nozzles connected to said ON/OFF valves which are turned ON when said plurality of ON/OFF valves are selectively turned ON, and a pressure value detected by said pressure-detecting member under this condition.

12. The fluid consumption amount-measuring apparatus according to any one of claim 8 or 9, wherein a nozzle having a variable effective cross-sectional area is connected to said ON/OFF valve.

13. The fluid consumption amount-measuring apparatus according to any one of claim 8 or 9, wherein said fluid consumption amount-measuring apparatus comprises, on said downstream side of said stop valve, a pressure fluid-discharging valve to which another nozzle having a known effective cross-sectional area is connected; and wherein said consumption amount of said pressure fluid is calculated by said calculating unit on the basis of a difference in effective cross-sectional area between said nozzle connected to said ON/OFF valve and said another nozzle connected to said pressure fluid-discharging valve, and a pressure value obtained when said ON/OFF valve is turned OFF and a pressure value obtained when said ON/OFF valve is turned ON in a state in which said pressure fluid-discharging valve is fully open to release a part of said pressure fluid from said another nozzle.

* * * * *